(12) United States Patent
Chang et al.

(10) Patent No.: US 9,927,673 B2
(45) Date of Patent: Mar. 27, 2018

(54) DISPLAY APPARATUS AND DISPLAYING METHOD THEREOF

(71) Applicant: Young Lighting Technology Inc., Hsin-Chu (TW)

(72) Inventors: Li-Wen Chang, Hsin-Chu (TW); Ching-Hsiang Li, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 0 days.

(21) Appl. No.: 15/241,018

(22) Filed: Aug. 18, 2016

(65) Prior Publication Data
US 2017/0168329 A1 Jun. 15, 2017

(30) Foreign Application Priority Data
Dec. 9, 2015 (TW) .............................. 104141284 A (51) Int. Cl.
*G02F 1/137* (2006.01)
*G02F 1/1335* (2006.01)
(Continued)

(52) U.S. Cl.
CPC ........... *G02F 1/137* (2013.01); *G02B 6/0023* (2013.01); *G02B 6/0043* (2013.01);
(Continued)

(58) Field of Classification Search
CPC . G02F 2001/13345; G02F 2001/13347; G02F 1/1334; G02F 1/13342
See application file for complete search history.

(56) References Cited

U.S. PATENT DOCUMENTS 8,770,813 B2 * 7/2014 Bohn ................ G02F 1/133615
362/601
9,063,266 B2 * 6/2015 Park ..................... G02B 6/0081
(Continued)

FOREIGN PATENT DOCUMENTS

| CN | 102679238 | 9/2012 |
| CN | 102866526 | 1/2013 |

(Continued)

OTHER PUBLICATIONS

"Office Action of Taiwan Counterpart Application", dated May 26, 2016, p. 1-p. 8.

*Primary Examiner* — Mariceli Santiago
(74) *Attorney, Agent, or Firm* — JCIPRNET (57) ABSTRACT

A display apparatus and a displaying method thereof are provided. The display apparatus includes a transmissive display panel, a liquid crystal glass, a backlight module and a transparent polarizer film. The liquid crystal glass is disposed at a side of the transmissive display panel. The liquid crystal glass has a transparent state and an atomization state and is adapted to switch between the transparent state and the atomization state. The backlight module is disposed at a side of the liquid crystal glass away from the transmissive display panel. The backlight module includes a transparent light-guiding plate and at least one light bar. The liquid crystal glass is located between the transmissive display panel and the transparent light-guiding plate. The transparent polarizer film is disposed at a side of the transparent light-guiding plate away from the liquid crystal glass.

18 Claims, 5 Drawing Sheets

(51) Int. Cl.
  *G02F 1/13357* (2006.01)
  *F21V 8/00* (2006.01)
  *G02F 1/133* (2006.01)
  *G02F 1/1333* (2006.01)
  *G02F 1/1334* (2006.01)
  *G06F 3/041* (2006.01)

(52) U.S. Cl.
  CPC ......... *G02B 6/0056* (2013.01); *G02B 6/0058* (2013.01); *G02F 1/1334* (2013.01); *G02F 1/13318* (2013.01); *G02F 1/13338* (2013.01); *G02F 2001/133626* (2013.01); *G06F 3/0412* (2013.01)

(56) References Cited

U.S. PATENT DOCUMENTS

| | | | |
|---|---|---|---|
| 2007/0268427 A1* | 11/2007 | Uehara | G02B 6/0016 349/62 |
| 2010/0177025 A1* | 7/2010 | Nagata | G02B 6/0028 345/76 |
| 2014/0184577 A1 | 7/2014 | Kim et al. | |
| 2015/0153503 A1 | 6/2015 | Leu | |

FOREIGN PATENT DOCUMENTS

| | | |
|---|---|---|
| CN | 203771885 | 8/2014 |
| CN | 104252063 | 12/2014 |
| CN | 104534357 | 4/2015 |
| CN | 204389830 | 6/2015 |
| CN | 105116592 | 12/2015 |
| TW | 201324468 | 6/2013 |

* cited by examiner

DISPLAY APPARATUS AND DISPLAYING METHOD THEREOF

CROSS-REFERENCE TO RELATED APPLICATION

This application claims the priority benefit of Taiwan application serial no. 104141284, filed on Dec. 9, 2015. The entirety of the above-mentioned patent application is hereby incorporated by reference herein and made a part of this specification.

BACKGROUND OF THE INVENTION

Field of the Invention

The invention is directed to a display apparatus and a displaying method thereof and more particularly to a transmissive display apparatus and a displaying method thereof.

Description of Related Art

A transmissive display apparatus currently available in the market consists of a transmissive display panel and a backlight module. An illumination beam provided by the backlight module can pass through the transmissive display panel, such that a user can view images carried by the transmissive display panel. The currently available transmissive display apparatus needs the backlight module to provide a stable light source for the display and thus, is incapable of adjusting brightness of the illumination beam according to an environment light source. In addition, the illumination beam of the backlight module can only unidirectionally pass through the transmissive display panel, and thus, the currently available transmissive display apparatus is unfree for the selection of a perspective function. Additionally, the transmissive display apparatuses available in the market are limited due to large volumes and poor transmittance which cause limitations to the application range of the transmissive display apparatuses.

The information disclosed in this "BACKGROUND OF THE INVENTION" section is only for enhancement of understanding of the background of the described technology and therefore it may contain information that does not form the prior art that is already known to a person of ordinary skill in the art. Further, the information disclosed in the "BACKGROUND OF THE INVENTION" section does not mean that one or more problems to be resolved by one or more embodiments of the invention was acknowledged by a person of ordinary skill in the art.

SUMMARY OF THE INVENTION

The invention is directed to a display apparatus capable of being switched between a perspective state and a non-perspective state.

The invention is also directed to a displaying method of the display apparatus which can achieve switching the display apparatus between the perspective state and the non-perspective state.

Other objects and advantages of the invention can be further illustrated by the technical features broadly embodied and described as follows.

To achieve at least one of the above-mentioned objectives, an embodiment of the invention provides a display apparatus including a transmissive display panel, a liquid crystal glass, a backlight module and a transparent polarizer film. The liquid crystal glass is disposed at a side of the transmissive display panel. The liquid crystal glass has a transparent state and an atomization state and adapted to switch between the transparent state and the atomization state. The backlight module is disposed at a side of the liquid crystal glass away from the transmissive display panel. The backlight module includes a transparent light-guiding plate and at least one light bar. The liquid crystal glass is located between the transmissive display panel and the transparent light-guiding plate. The transparent polarizer film is disposed at a side of the transparent light-guiding plate away from the liquid crystal glass. When the liquid crystal glass is in the transparent state, an ambient light beam sequentially penetrates the transparent polarizer film, the transparent light-guiding plate and the liquid crystal glass to provide a backlight source required by the transmissive display panel for displaying an image. when the liquid crystal glass is in the atomization state, an illumination beam emitted by the at least one light bar of the backlight module enters the transparent light-guiding plate and is guided to the liquid crystal glass, such that the illumination beam penetrates the liquid crystal glass to serve as the backlight source required by the transmissive display panel for displaying the image.

An embodiment of the invention further provides a displaying method of a display apparatus, which includes step as follows. A display apparatus is provided. The display apparatus includes a transmissive display panel, a liquid crystal glass, a backlight module and a transparent polarizer film. The liquid crystal glass is disposed at a side of the transmissive display panel. The liquid crystal glass has a transparent state and an atomization state and is adapted to switch between the transparent state and the atomization state. The backlight module is disposed at a side of the liquid crystal glass away from the transmissive display panel. The backlight module includes a transparent light-guiding plate and at least one light bar. The liquid crystal glass is located between the transmissive display panel and the transparent light-guiding plate. The transparent polarizer film is disposed at a side of the transparent light-guiding plate away from the liquid crystal glass. An intensity of an ambient light beam is sensed by the display apparatus. According to the intensity of the ambient light beam, the liquid crystal glass is turned on, and the at least one light bar of the backlight module is turned off, such that the liquid crystal glass is in the transparent state, and the ambient light beam sequentially penetrates the transparent polarizer film, the transparent light-guiding plate and the liquid crystal glass to provide a backlight source required by the transmissive display panel for displaying the image. Alternatively, according to the intensity of the ambient light beam, the liquid crystal glass is turned off, and the at least one light bar of the backlight module is turned on, such that the liquid crystal glass is in the atomization state, and an illumination beam emitted by the at least one light bar of the backlight module enters the transparent light-guiding plate and is guided to the liquid crystal glass, and the illumination beam penetrates the liquid crystal glass to serve as the backlight source required by the transmissive display panel for displaying the image.

Based on the above, the embodiments of the invention may have at least one of the advantages or effect below. The display apparatus of the invention has the liquid crystal glass capable of switching between the transparent state and the atomization state. Thus, when the liquid crystal glass is in the transparent state, the ambient light beam can sequentially penetrate the transparent polarizer film, the transparent light-guiding plate and the liquid crystal glass to provide the backlight source required by the transmissive display panel for displaying the image. On the other hand, when the liquid crystal glass is in the atomization state, the illumination beam emitted by the light bar of the backlight module can enter the transparent light-guiding plate and be guided to the liquid crystal glass, such that the illumination beam can penetrate the liquid crystal glass to serve as the backlight source required by the transmissive display panel for displaying the image. In this way, the display apparatus can be switched between the perspective state and the non-perspective state.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," or "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
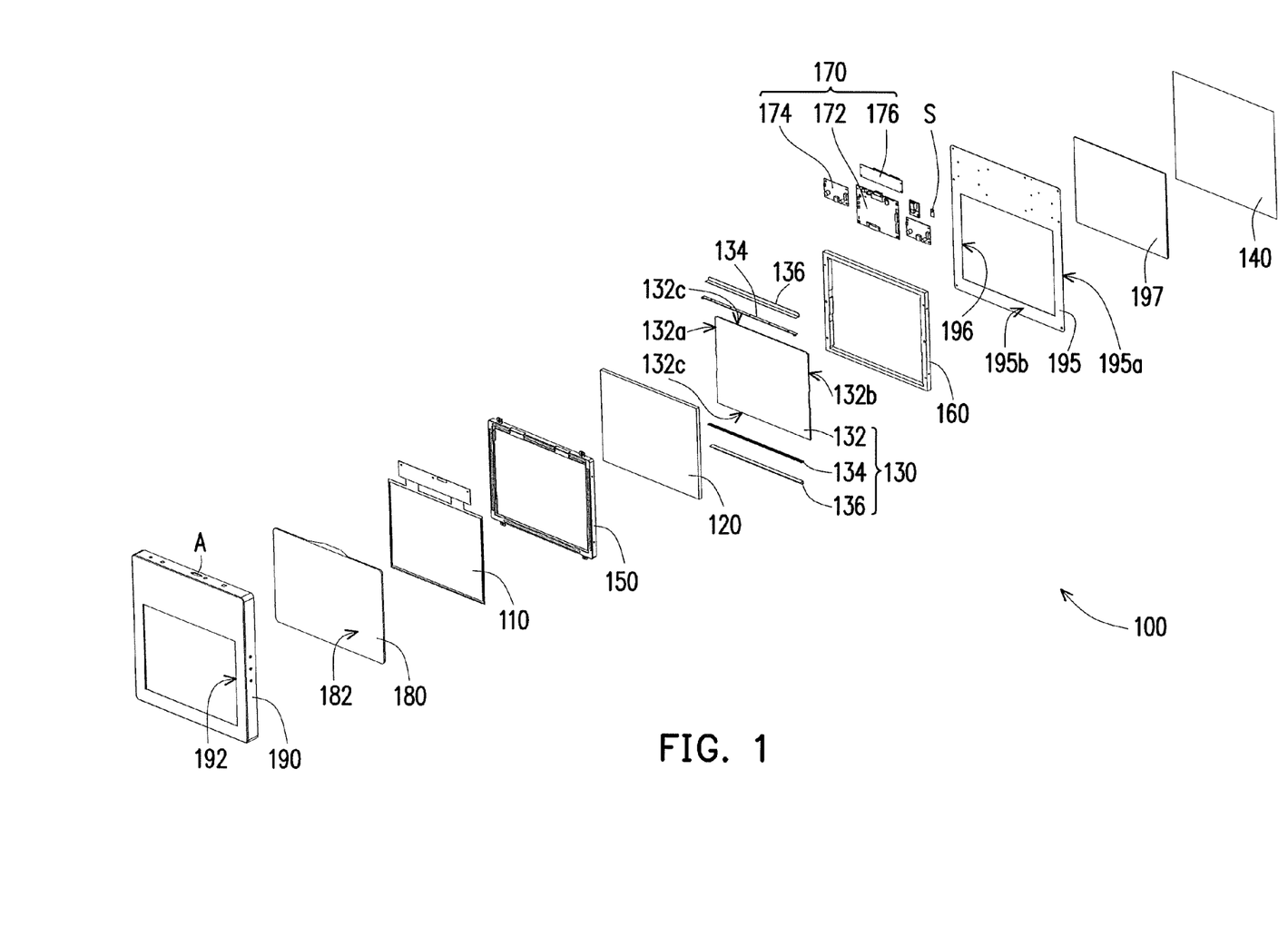
FIG. 1 is a schematic exploded-view diagram illustrating a display apparatus according to an embodiment of the invention.

FIG. 1 is a schematic exploded-view diagram illustrating a display apparatus according to an embodiment of the invention. Referring to FIG. 1, in the embodiment, a display apparatus 100 includes a transmissive display panel 110, a liquid crystal glass 120, a backlight module 130 and a transparent polarizer film 140. The liquid crystal glass 120 is disposed at a side of the transmissive display panel 110. The liquid crystal glass 120 has a transparent state and an atomization state, and the liquid crystal glass 120 is adapted to switch between the transparent state and the atomization state. The backlight module 130 is disposed at a side of the liquid crystal glass 120 away from the transmissive display panel 110. The backlight module 130 includes a transparent light-guiding plate 132 and at least one light bar 134 (exemplarily illustrated as two in FIG. 1). The liquid crystal glass 120 is located between the transmissive display panel 110 and the transparent light-guiding plate 132. The transparent polarizer film 140 is disposed at a side of the transparent light-guiding plate 132 away from the liquid crystal glass 120.

Figure 2A:
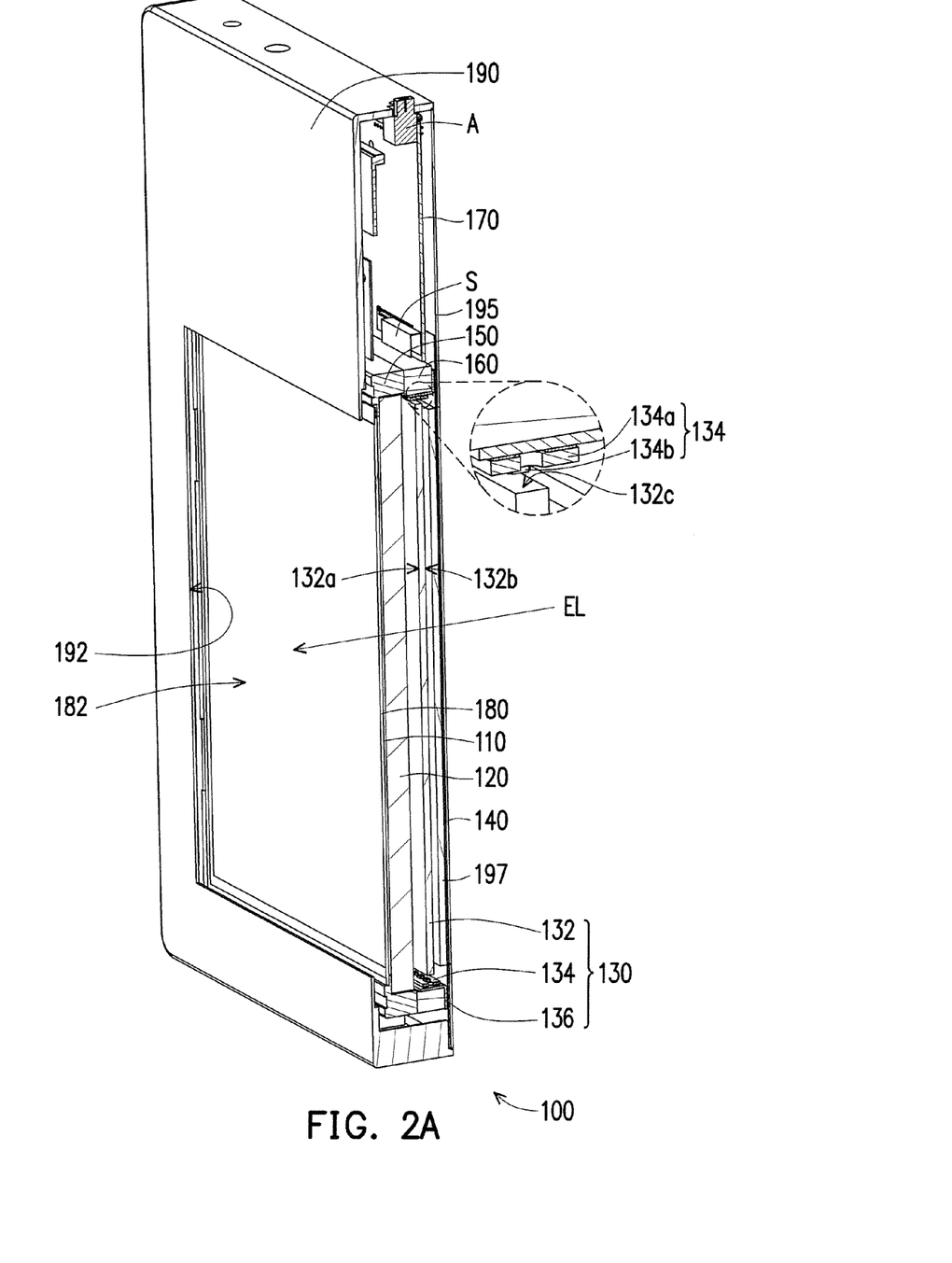
FIG. 2A is a schematic three-dimensional cross-sectional diagram of the display apparatus depicted in FIG. 1 when the liquid crystal glass is in the transparent state.
Figure 2B:
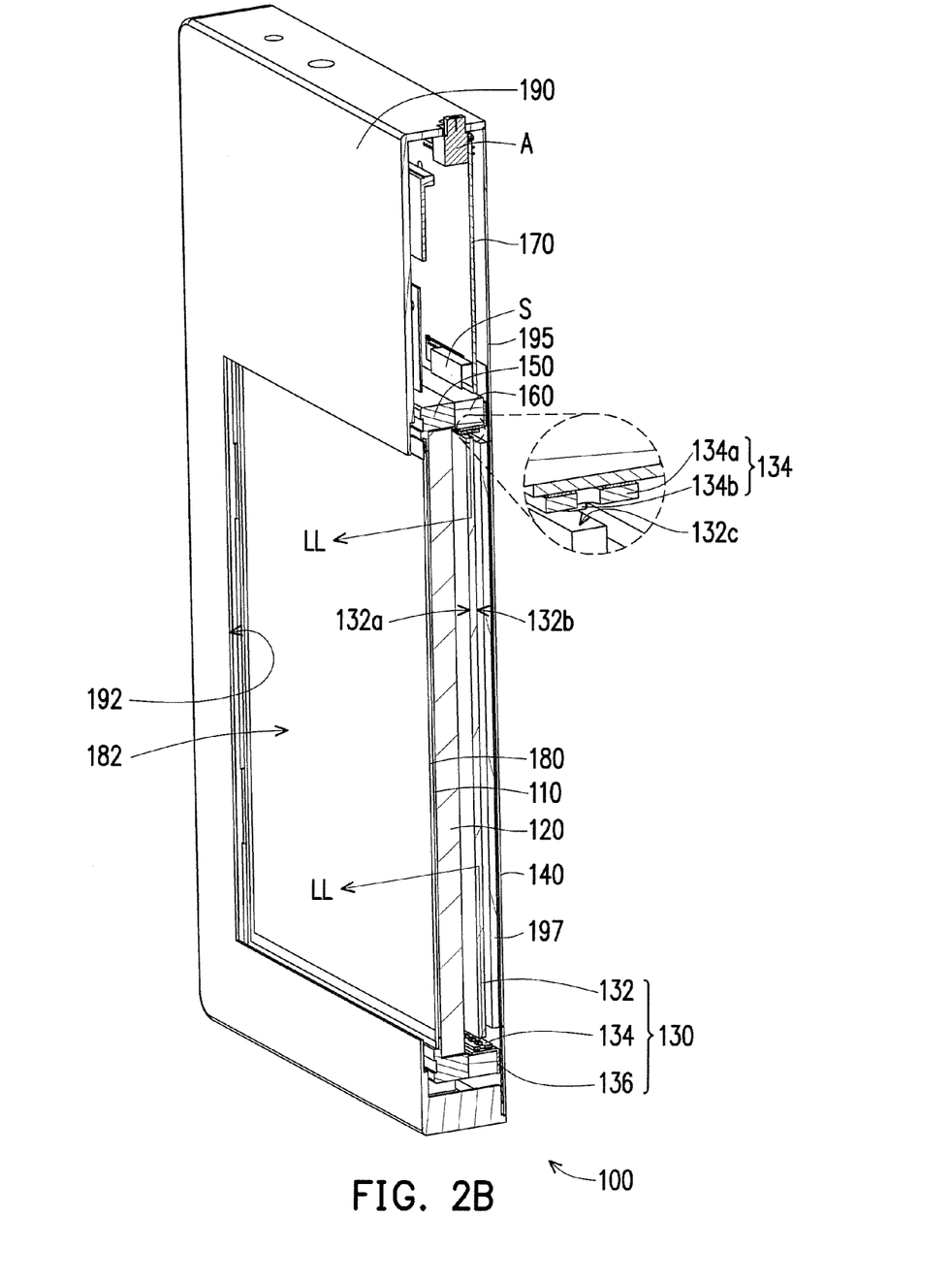
FIG. 2B is a schematic three-dimensional cross-sectional diagram of the display apparatus depicted in FIG. 1 when the liquid crystal glass is in the atomization state.

FIG. 2A is a schematic three-dimensional cross-sectional diagram of the display apparatus depicted in FIG. 1 when the liquid crystal glass is in the transparent state. FIG. 2B is a schematic three-dimensional cross-sectional diagram of the display apparatus depicted in FIG. 1 when the liquid crystal glass is in the atomization state. Referring to FIG. 2A, when the liquid crystal glass 120 is in the transparent state, an ambient light beam EL sequentially penetrates the transparent polarizer film 140, the transparent light-guiding plate 132 and the liquid crystal glass 120 to provide a backlight source required by the transmissive display panel 100 for displaying an image. Referring to FIG. 2B, when the liquid crystal glass 120 is in the atomization state, an illumination beam LL emitted by the light bars 134 of the backlight module 130 enters the transparent light-guiding plate 132 and is guided to the liquid crystal glass 120, such that the illumination beam LL penetrates the liquid crystal glass 120 to serves as the backlight source required by the transmissive display panel 100 for displaying the image. In brief, the display apparatus 100 of the invention has a perspective function, namely, the display apparatus 100 has corresponding perspective and non-perspective states by means of the liquid crystal glass 120 switching between a the transparent state and the atomization state.

In detail, referring to FIG. 1, FIG. 2A and FIG. 2B, the transmissive display panel 110 of the embodiment is, for example, a transmissive liquid crystal display (LCD) panel or an organic electroluminescent (OEL) display panel, but the invention is not limited thereto. The liquid crystal glass 120 of the embodiment is implemented as a polymer dispersed liquid crystal (PDLC) glass, which consists of micron-sized liquid crystal droplets dispersed in an organic solid polymer matrix. Since an optical axis of the droplets formed by liquid crystal molecules is in a free orientation, a refractive index of the liquid crystal droplets does not match a refractive index of the matrix, and the liquid crystal glass presents an atomized or non-transparent opal state or a semi-transparent state when the light beam pass through the matrix and is strongly scattered by the liquid crystal droplets. When an electric field is applied, the orientation of the optical axis orientation of the liquid crystal droplets may be adjusted, and thus, when the refractive indices of both match with each other, the liquid crystal glass may present the transparent state; otherwise, when the electric field is removed, the liquid crystal droplets resume to the original scattered state and thus, the liquid crystal glass may present the atomization state. In brief, the liquid crystal glass 120 is capable of enabling and disabling the perspective function of the display apparatus 100. Additionally, the display apparatus 100 of the embodiment further includes a fixing frame 150, and the transmissive display panel 110 and the liquid crystal glass 120 are respectively assemble on the fixing frame 150, such that relative positions of the transmissive display panel 110 and the liquid crystal glass 120 are fixed by the fixing frame 150.

In addition, the backlight module 130 of the embodiment further includes at least one light-shielding plate 136 (exemplarily illustrated as two in FIG. 1) covering the at least one light bar 134. Referring to FIG. 1, FIG. 2A and FIG. 2B simultaneously, each light bar 134 of the embodiment consists of, for example, a circuit board 134a and a plurality of light-emitting diodes (LEDs) 134b disposed of the circuit board 134a, in which the LEDs 134b include at least one red LED, at least one green LED and at least one blue LED, but the invention is not limited thereto. Each of the light-shielding plates 136 is configured to shield red light, green light and blue light directly emitted by the light bars 134, without being mixed, such that the backlight module 130 may be prevented from a color unevenness phenomenon, and the light beam emitted from the light bars 134 and transmitted toward a direction away from transparent light-guiding plate 132 may be shielded to avoid loss of light energy. Additionally, the display apparatus 100 of the embodiment further includes a module frame 160, and the transparent light-guiding plate 132, the light bars 134 and the light-shielding plates 136 are assembled on the module frame 160, such that relative positions of the transparent light-guiding plate 132, the light bars 134 and the light-shielding plates 136 are fixed by the module frame 160.

Furthermore, the transparent light-guiding plate 132 of the embodiment has a light-emitting surface 132a and an first light-incident surface 132b which are opposite to each other, at least one second light-incident surface 132c (exemplarily illustrated as two in FIG. 1) connected with the light-emitting surface 132a and the first light-incident surface 132b, and a plurality of optical micro-structures 132d (illustrated in FIG. 3 and FIG. 4) disposed on the first light-incident surface 132b. The transparent light-guiding plate 132 is made of a transparent material, such as polymethyl methacrylate (PMMA), polycarbonate (PC) or glass. Referring to FIG. 1, FIG. 2A and FIG. 2B, the light-emitting surface 132a of the transparent light-guiding plate 132 faces the liquid crystal glass 120, and the first light-incident surface 132b faces the transparent polarizer film 140. The ambient light beam EL enters the transparent light-guiding plate 132 through the first light-incident surface 132b of the transparent light-guiding plate 132 and exits from the light-emitting surface 132a. The light bars 134 are adapted to emit the illumination beam LL and are respectively disposed on the second light-incident surfaces 132c of the transparent light-guiding plate 132. The illumination beam LL enters the transparent light-guiding plate 132 through the second light-incident surfaces 132c and exits from the light-emitting surface 132a.

Figure 3:
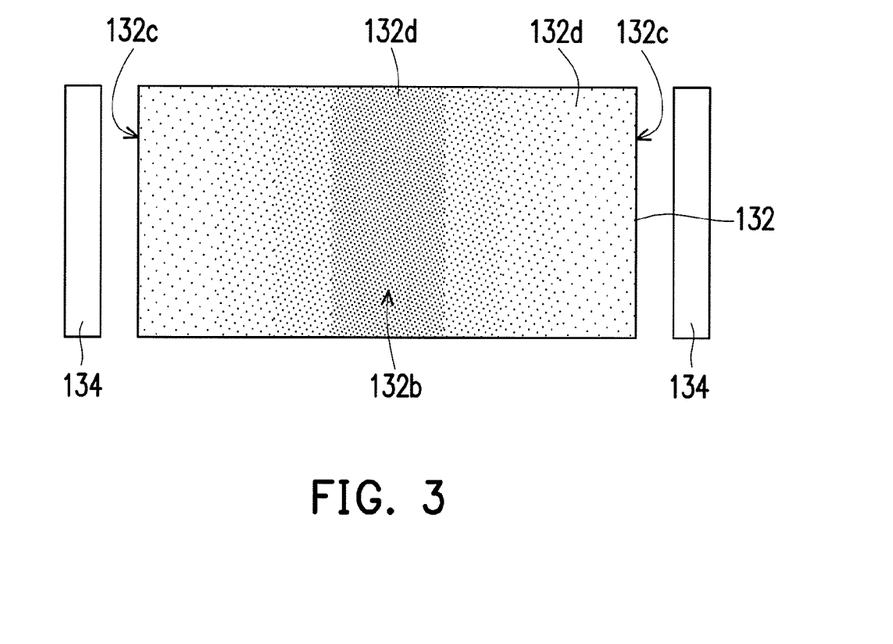
FIG. 3 is a schematic bottom-view diagram of the transparent light-guiding plate and the light bar depicted in FIG. 1.
Figure 4:
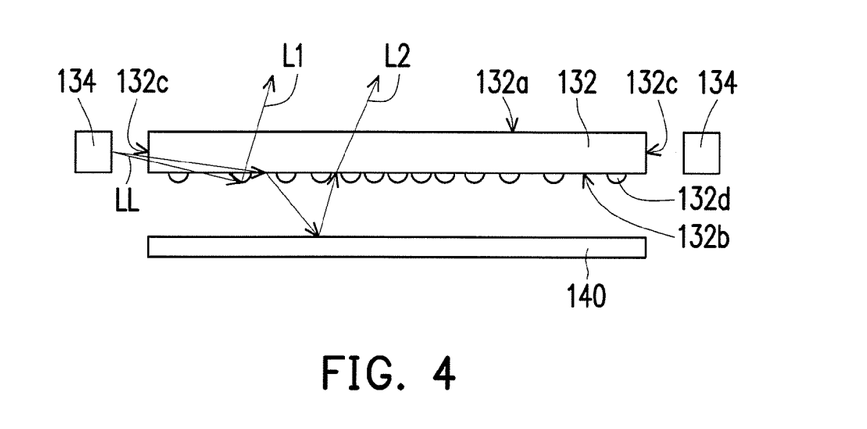
FIG. 4 is a schematic cross-sectional diagram illustrating the illumination beam emitted by the light bar depicted in FIG. 1 penetrating the transparent light-guiding plate, the optical micro-structures and the transparent polarizer film.

FIG. 3 is a schematic bottom-view diagram of the transparent light-guiding plate and the light bar depicted in FIG. 1. FIG. 4 is a schematic cross-sectional diagram illustrating the illumination beam emitted by the light bar depicted in FIG. 1 penetrating the transparent light-guiding plate, the optical micro-structures and the transparent polarizer film. Referring to FIG. 3, the optical micro-structures 132d disposed on the first light-incident surface 132b of the transparent light-guiding plate 132 are implemented as a plurality of net points, such as convex net points or concave net points. Preferably, a distribution density of the optical micro-structures 132d increases as a distance thereof from the at least one second light-incident surface 132c progressively increases. The optical micro-structures 132d may destroy total reflection of the light beams (including the ambient light beam EL and the illumination beam LL) travelling in the transparent light-guiding plate 132, such that the light beams are transmitted to the light-emitting surface 132a of the transparent light-guiding plate 132 and exits from the light-emitting surface 132a of the transparent light-guiding plate 132.

Referring to FIG. 2B and FIG. 4 simultaneously, when the liquid crystal glass 120 is switched to the atomization state, the illumination beam LL emitted by the light bars 134 enters the transparent light-guiding plate 132 through the second light-incident surfaces 132c, a first portion L1 of the illumination beam LL travelling in the transparent light-guiding plate 132 is guided by the optical micro-structures 132d disposed on the first light-incident surface 132b to the light-emitting surface 132a, a second portion L2 of the illumination beam LL travelling in the transparent light-guiding plate 132 penetrates the first light-incident surface 132b of the transparent light-guiding plate 132 and is reflected by the transparent polarizer film 140 back to the transparent light-guiding plate 132, both the first portion L1 and the second portion L2 of the illumination beam LL exit from the light-emitting surface 132a of the transparent light-guiding plate 132. Preferably, the transparent polarizer film 140 of the embodiment is implemented as a polarizer film with a brightness enhancement film, such as an advanced polarization conversion film (APCF) manufactured by Nitto Denko. The APCF can facilitate in significantly enhancing a utilization rate of the light beams with the use of polarizing characteristics, and therefore, the APCF not only achieves good brightness in a frontal viewing angle like a prism sheet, but also effectively enhances the brightness in an oblique viewing angle. In brief, the transparent polarizer film 140 is configured to reflect the second portion L2 of the illumination beam LL back to the transparent light-guiding plate 132 to improve brightness of the display apparatus 100 and maintains transmittance of the image. Additionally, the liquid crystal glass 120 in the atomization state receives the illumination beam LL emitted from the light-emitting surface 132a of the transparent light-guiding plate 132, homogenizes the illumination beam LL and is transmitted to the transmissive display panel 110.

Additionally, referring to FIG. 1, FIG. 2A and FIG. 2B again, the display apparatus 100 of the embodiment further includes a control unit 170. The control unit 170 is electrically connected with the transmissive display panel 110, the liquid crystal glass 120 and the backlight module 130, respectively. In detail, a micro controller 172 of the control unit 170 is electrically connected with the transmissive display panel 110 and the liquid crystal glass 120, and a light controller 174 of the control unit 170 is electrically connected with the circuit boards 134a of the light bars 134 and configured to control brightness changes of the light bars 134. The display apparatus 100 further includes a touch panel 180. The touch panel 180 is disposed at a side of the transmissive display panel 110 away from the liquid crystal glass 120, electrically connected to a touch controller 176 of the control unit 170 and configured to provide a user with a capability of operating the display apparatus 100 by means of touching. In brief, the display apparatus 100 of the embodiment has not only a displaying function but also a touch control function.

In addition, in order to effectively protect the transmissive display panel 110, the liquid crystal glass 120, the backlight module 130 and the control unit 170, the display apparatus 100 of the embodiment further includes a front frame 190 and a backplate 195. The backplate 195 and the front frame 190 are assembled to each other to cover the touch panel 180, the transmissive display panel 110, the liquid crystal glass 120, the backlight module 130 and the control unit 170 and serves to protect all the aforementioned elements. The front frame 190 and the backplate 195 may be made of a metal with stronger supporting effect, but the invention is not limited thereto. In detail, in the embodiment, the front frame 190 has a first opening 192, the touch panel 180 is assembled on the front frame 190, and the first opening 192 of the front frame 190 exposes a touch surface 182 of the touch panel 180, such that the user may perform a touch operation on an image displayed on the touch surface 182 correspondingly to the transmissive display panel 110. The control unit 170 is disposed between the front frame 190 and the backplate 195 and located at the same side of the transmissive display panel 110, the liquid crystal glass 120 and the backlight module 130. In the embodiment illustrated in FIG. 2A and FIG. 2B, the control unit 170 is disposed at an upper side of the transmissive display panel 110, the liquid crystal glass 120 and the backlight module 130 and fixed between the front frame 190 and the backplate 195. The backplate 195 has a second opening 196 (as shown in FIG. 1), and a protective cover 197 is disposed on the second opening 196. The protective cover 197 is configured to protect the transparent light-guiding plate 132 of the backlight module 130 and made of a transparent material, such as glass or plastic. Referring to FIG. 1, FIG. 2A and FIG. 2B, the transparent polarizer film 140 of the embodiment is implemented as being adhered to a surface 195a of the backplate 195 away from the transparent light-guiding plate 132. In other embodiments that are not illustrated, the transparent polarizer film 140 may also be adhered to another surface 195b of the backplate 195 adjacent to the transparent light-guiding plate 132, a surface of the protective cover 197 away from the transparent light-guiding plate 132, or alternatively, a surface of the protective cover 197 facing the transparent light-guiding plate 132. In other embodiments, the transparent polarizer film 140 may be disposed between the transparent light-guiding plate 132 and the backplate 195. The transparent polarizer film 140, as long as being disposed at the side of the transparent light-guiding plate 132 away from the liquid crystal glass 120, falls within the scope over which the invention seeks protection.

In addition, referring to FIG. 1, FIG. 2A and FIG. 2B again, the display apparatus 100 of the embodiment further includes a photosensitive device S electrically connected to the control unit 170 and configured to sense an intensity of the ambient light beam EL. In detail, the photosensitive device S of the embodiment is disposed on the backplate 195 and configured to detect the intensity of the ambient light beam EL in back of the display apparatus 100, so as to correspondingly switch the liquid crystal glass 120 between the transparent state and the atomization state, and correspondingly switch on and off the light bars 134. Additionally, the display apparatus 100 further includes a manual switch component disposed at a side of the front frame 190 and electrically connected to the control unit 170. The manual switch component A is used to manually switch the liquid crystal glass 120 between the transparent state and the atomization state, manually switch on and off the light bars 134, and also manually adjust the brightness of the light bars 134. In other embodiments that are not illustrated, the display apparatus may also be disposed with two photosensitive devices according to its installation environment. The two photosensitive devices may be disposed on the front frame and the backplate, respectively and configured to detect intensities of the ambient light beam form the front and from the back, so as to achieve manually switching/automatically switching on and off the liquid crystal glass and the light bars.

In the display apparatus 100 of the embodiment, the transmissive display panel 110 and the liquid crystal glass 120 are assembled between the front frame 190 and the backplate 195 through the fixing frame 150, the transparent light-guiding plate 132, the light bars 134 and the light-shielding plates 136 are assembled between the front frame 190 and the backplate 195 through the module frame 160, and the fixing frame 150 and the module frame 160 are also adjacently fixed between the front frame 190 and the backplate 195. Through the stacking mechanism design described above, the touch panel 180, the transmissive display panel 110, the liquid crystal glass 120 and the transparent light-guiding plate 132 sequentially disposed between the front frame 190 and the backplate 195 may effectively reduce a thickness of the display apparatus 100, so as to reduce an overall volume of the display apparatus 100 and improve the application range of the display apparatus 100. For example, display apparatus 100 of the embodiment may be applied to the use in house windows. In this case, the perspective function of the liquid crystal glass 120 may be turned on in the daytime, such that the light bars 134 of the backlight module 130 are less applied, and the ambient light beam EL serves as the backlight source, while the perspective function of the liquid crystal glass 120 may be turned off at night when privacy is needed, and the illumination beam LL of the backlight module 130 serves as the backlight source, such that the display apparatus 100 achieves not only the image displaying function but also the use as a lighting source. Alternatively, the display apparatus 100 of the embodiment may also be assembled to a front windshield of a boat or ship, such that the display apparatus 100 may serve not only as a playback media of a navigation radar system, but also for a pilot to observe the ocean climate outside the boat or ship while turning on the perspective function of the display apparatus 100. Alternatively, the display apparatus 100 of the embodiment may also be assembled to a front windshield of a vehicle to serve as a playback media for condition information, entertainment videos and audios, a mobile apparatus or a navigation system, such that a driver may viewing traffic situations outside the vehicle when checking the condition information and navigation routes. Additionally, the driver may operate a mobile apparatus through the touch panel 180 of the display apparatus 100 to reduce driving risks and may switch the display apparatus 100 to the non-perspective state by means of touch controlling when needing privacy. In another case, the display apparatus 100 of the embodiment may also be applied to the glass of a public transportation vehicle to serve not only a media player, but also a window which merely provides dim light without any perspective function.

Figure 5:
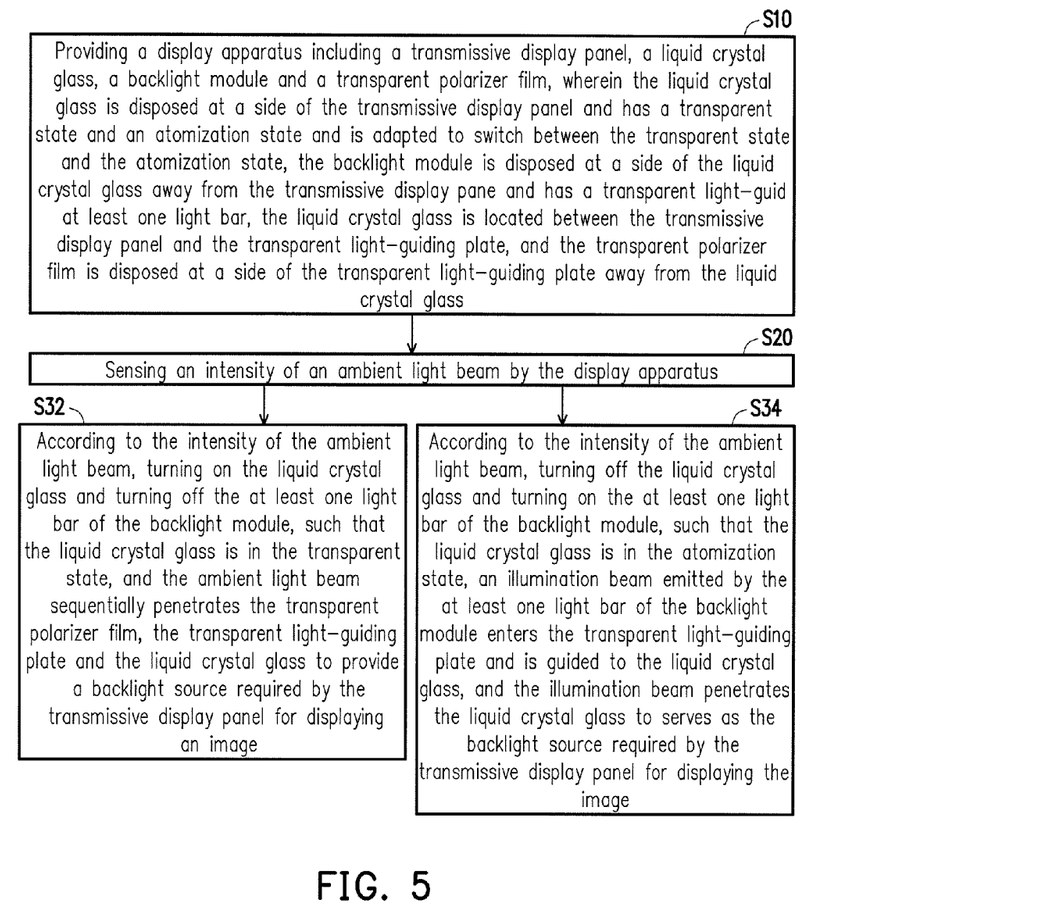
FIG. 5 is a flowchart illustrating a displaying method of a display apparatus according to an embodiment of the invention.

FIG. 5 is a flowchart illustrating a displaying method of a display apparatus according to an embodiment of the invention. Referring to FIG. 5, in a displaying method of a display apparatus of the embodiment, a display apparatus is provided in step S10. The display apparatus including a transmissive display panel, a liquid crystal glass, a backlight module and a transparent polarizer film is provided. The liquid crystal glass is disposed at a side of the transmissive display panel. The liquid crystal glass has a transparent state and an atomization state and is adapted to switch between the transparent state and the atomization state. The backlight module is disposed at a side of the liquid crystal glass away from the transmissive display pane and includes a transparent light-guiding plate and at least one light bar. The liquid crystal glass is located between the transmissive display panel and the transparent light-guiding plate. The transparent polarizer film is disposed at a side of the transparent light-guiding plate away from the liquid crystal glass. Then, in step S20, an intensity of an ambient light beam is sensed by the display apparatus.

Then, in step S32, the liquid crystal glass is turned on, and the light bars of the backlight module are turned off according to the intensity of the ambient light beam, such that the liquid crystal glass is in the transparent state, and the ambient light beam sequentially penetrates the transparent polarizer film, the transparent light-guiding plate and the liquid crystal glass to provide a backlight source required by the transmissive display panel for displaying an image. Alternatively, in step S34, the liquid crystal glass is turned off, and the light bars of the backlight module are turned on according to the intensity of the ambient light beam, such that the liquid crystal glass is in the atomization state, and an illumination beam emitted by the light bars of the backlight module enters the transparent light-guiding plate and is guided to the liquid crystal glass, such that the illumination beam penetrates the liquid crystal glass to serve as the backlight source required by the transmissive display panel for displaying the image.

In detail, the display apparatus of the embodiment is same as the display apparatus 100 illustrated in FIG. 1, in which the photosensitive device S is electrically connected to the control unit 170 and configured to sense the intensity of the ambient light beam EL, the control unit 170 are electrically connected with the transmissive display panel 110, the liquid crystal glass 120 and the backlight module 130, respectively, and the photosensitive device S senses the intensity of the ambient light beam EL and transmit a brightness information to the control unit 170 according to the intensity of the ambient light beam EL. Thus, when the control unit 170 determines that the intensity of the ambient light beam EL is greater than a predetermined value (e.g., in the daytime), the liquid crystal glass 120 is turned on, and the light bars 134 of the backlight module 130 are turned off, such that the liquid crystal glass 120 is in the transparent state. In this circumstance, the user may view not only the image displayed by the display apparatus 100, but also the background environment in back of the display apparatus 100. Namely, the display apparatus 100 has the perspective function.

Alternatively, when the control unit 170 determines that the intensity of the ambient light beam EL is less than the predetermined value (e.g., at night), the liquid crystal glass 120 is turned off, and the light bars 134 of the backlight module 130 are turned on, such that the liquid crystal glass 120 is in the atomization state. In this circumstance, the control unit 170 transmits a brightness adjustment signal to the backlight module 130 according to the brightness information sensed by the photosensitive device S, so as to adjust the brightness of the illumination beam LL of the backlight module 130. In other words, the perspective function of the display apparatus 100 in this case is turned off, and the backlight source required by the transmissive display panel 110 is provided by the illumination beam LL emitted by the backlight module 130.

Besides the display apparatus 100 of the embodiment achieves automatically switching the liquid crystal glass 120 between the transparent state and the atomization state and automatically switching on and off the light bar 134 according to the intensity of the ambient light beam EL sensed by the photosensitive device S, the displaying method of the display apparatus 100 further includes providing a manual switch component A electrically connected to the control unit 170. Through the manual switch component A, the liquid crystal glass 120 is turned on, and the light bars 134 of the backlight module 130 are turned off, or alternatively, the liquid crystal glass 120 is turned off, and the light bars 134 of the backlight module 130 are turned on. In brief, the user may adjust the brightness of the illumination beam LL emitted by the light bars 134 of the backlight module 130 directly through the manual switch component A according to the environment brightness in the circumstance and personal demands. For example, the user turns off the liquid crystal glass 120 and turns on the light bars 134 of the backlight module 130 through the manual switch component A. In the daytime, the brightness of the illumination beam LL output by the light bars 134 may be increased through the manual switch component A (e.g., up to 3000 NITS), or alternatively, at night, the brightness of the illumination beam LL output by the light bars 134 may be reduced through the manual switch component A (e.g., down to 250 NTS).

Based on the above, the embodiments of the invention achieve at least one of the following advantages or effects. The display apparatus of the invention has the liquid crystal glass capable of switching the transparent state and the atomization state, and thus, when the liquid crystal glass is in the transparent state, the ambient light beam can sequentially penetrate the transparent polarizer film, the transparent light-guiding plate and the liquid crystal glass to provide the backlight source required by the transmissive display panel for displaying the image. On the other hand, when the liquid crystal glass is in the atomization state, the illumination beam emitted by the light bars of the backlight module can enter the transparent light-guiding plate and be guided to the liquid crystal glass, such that the illumination beam can penetrate the liquid crystal glass to serve as the backlight source required by the transmissive display panel for displaying the image. In this way, the display apparatus of the invention can be switched between the perspective state and the non-perspective state. In addition, the elements of the display apparatus the embodiments of the invention, including the transmissive display panel, the liquid crystal glass, the backlight module and the transparent polarizer film, are designed in the stacking mechanism, and thus, the overall volume of the display apparatus can be reduced, the appearance size of the display apparatus can be shrunk, such that the application range of the display apparatus can be increased. Additionally, with the touch panel, the display apparatus of the invention can be provided with the displaying and touch controlling functions.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display apparatus, comprising:
a transmissive display panel;
a liquid crystal glass, disposed at a side of the transmissive display panel, having a transparent state and an atomization state and adapted to switch between the transparent state and the atomization state;
a backlight module, disposed at a side of the liquid crystal glass away from the transmissive display panel, the backlight module comprising a transparent light-guiding plate and at least one light bar, and the liquid crystal glass being located between the transmissive display panel and the transparent light-guiding plate; and
a transparent polarizer film, disposed at a side of the transparent light-guiding plate away from the liquid crystal glass, wherein the transparent polarizer film has a brightness enhancement function, and when the liquid crystal glass is in the transparent state, an ambient light beam sequentially penetrates the transparent polarizer film, the transparent light-guiding plate and the liquid crystal glass to provide a backlight source required by the transmissive display panel for displaying an image, and when the liquid crystal glass is in the atomization state, an illumination beam emitted by the at least one light bar of the backlight module enters the transparent light-guiding plate and is guided to the liquid crystal glass, such that the illumination beam penetrates the liquid crystal glass to serve as the backlight source required by the transmissive display panel for displaying the image.

2. The display apparatus according to claim 1, further comprising:
a fixing frame, the transmissive display panel and the liquid crystal glass being respectively assembled on the fixing frame.

3. The display apparatus according to claim 1, wherein the liquid crystal glass is a polymer dispersed liquid crystal (PDLC) glass.

4. The display apparatus according to claim 1, further comprising:
a control unit, electrically connected with the transmissive display panel, the liquid crystal glass and the backlight module respectively.

5. The display apparatus according to claim 4, further comprising:
a front frame, having a first opening; and
a backplate, assembled with the front frame, wherein the front frame and the backplate cover the transmissive display panel, the liquid crystal glass, the backlight module and the control unit.

6. The display apparatus according to claim 5, wherein the transparent polarizer film is adhered to a surface of the backplate adjacent to the transparent light-guiding plate, adhered to another surface of the backplate away from the transparent light-guiding plate, or disposed between the transparent light-guiding plate and the backplate.

7. The display apparatus according to claim 5, further comprising:
a manual switch component, disposed on a side of the front frame and electrically connected to the control unit.

8. A display apparatus, comprising:
a transmissive display panel;
a liquid crystal glass, disposed at a side of the transmissive display panel, having a transparent state and an atomization state and adapted to switch between the transparent state and the atomization state;
a backlight module, disposed at a side of the liquid crystal glass away from the transmissive display panel, the backlight module comprising a transparent light-guiding plate and at least one light bar, and the liquid crystal glass being located between the transmissive display panel and the transparent light-guiding plate; and
a transparent polarizer film, disposed at a side of the transparent light-guiding plate away from the liquid crystal glass, wherein when the liquid crystal glass is in the transparent state, an ambient light beam sequentially penetrates the transparent polarizer film, the transparent light-guiding plate and the liquid crystal glass to provide a backlight source required by the transmissive display panel for displaying an image, and when the liquid crystal glass is in the atomization state, an illumination beam emitted by the at least one light bar of the backlight module enters the transparent light-guiding plate and is guided to the liquid crystal glass, such that the illumination beam penetrates the liquid crystal glass to serve as the backlight source required by the transmissive display panel for displaying the image;
wherein the backlight module further comprises at least one light-shielding plate covering the at least one light bar, the transparent light-guiding plate has a light-emitting surface and a first light-incident surface which are opposite to each other, at least one second light-incident surface connecting the light-emitting surface with the first light-incident surface and a plurality of optical micro-structures disposed on the first light-incident surface, wherein the light-emitting surface faces the liquid crystal glass, the first light-incident surface faces the transparent polarizer film, the at least one light bar is adapted to emit the illumination beam and is disposed on the at least one second light-incident surface of the transparent light-guiding plate, wherein the illumination beam enters the transparent light-guiding plate through the at least one second light-incident surface, and a distribution density of the optical micro-structures disposed on the first light-incident surface increases as a distance thereof from the at least one second light-incident surface progressively increases.

9. The display apparatus according to claim 8, further comprising:
a module frame, the transparent light-guiding plate, the at least one light bar and the at least one light-shielding plate being assembled on the module frame.

10. The display apparatus according to claim 8, wherein when the liquid crystal glass is in the atomization state, a first portion of the illumination beam entering the transparent light-guiding plate through the at least one second light-incident surface is guided to the light-emitting surface by the optical micro-structures, and a second portion of the illumination beam penetrates the first light-incident surface of the transparent light-guiding plate and is reflected back to the transparent light-guiding plate by the transparent polarizer film.

11. The display apparatus according to claim 8, wherein the optical micro-structures are a plurality of net points.

12. A display apparatus, comprising:
a transmissive display panel;
a liquid crystal glass, disposed at a side of the transmissive display panel, having a transparent state and an atomization state and adapted to switch between the transparent state and the atomization state;
a backlight module, disposed at a side of the liquid crystal glass away from the transmissive display panel, the backlight module comprising a transparent light-guiding plate and at least one light bar, and the liquid crystal glass being located between the transmissive display panel and the transparent light-guiding plate;
a transparent polarizer film, disposed at a side of the transparent light-guiding plate away from the liquid crystal glass, wherein when the liquid crystal glass is in the transparent state, an ambient light beam sequentially penetrates the transparent polarizer film, the transparent light-guiding plate and the liquid crystal glass to provide a backlight source required by the transmissive display panel for displaying an image, and when the liquid crystal glass is in the atomization state, an illumination beam emitted by the at least one light bar of the backlight module enters the transparent light-guiding plate and is guided to the liquid crystal glass, such that the illumination beam penetrates the liquid crystal glass to serve as the backlight source required by the transmissive display panel for displaying the image;
a control unit, electrically connected with the transmissive display panel, the liquid crystal glass and the backlight module respectively;
a front frame, having a first opening;
a backplate, assembled with the front frame, wherein the front frame and the backplate cover the transmissive display panel, the liquid crystal glass, the backlight module and the control unit; and
a touch panel, disposed at a side of the transmissive display panel away from the liquid crystal glass and electrically connected to the control unit, the touch panel being assembled on the front frame, and the first opening of the front frame exposing a touch surface of the touch panel.

13. A display apparatus, comprising:
a transmissive display panel;
a liquid crystal glass, disposed at a side of the transmissive display panel, having a transparent state and an atomization state and adapted to switch between the transparent state and the atomization state;
a backlight module, disposed at a side of the liquid crystal glass away from the transmissive display panel, the backlight module comprising a transparent light-guiding plate and at least one light bar, and the liquid crystal glass being located between the transmissive display panel and the transparent light-guiding plate;
a transparent polarizer film, disposed at a side of the transparent light-guiding plate away from the liquid crystal glass, wherein when the liquid crystal glass is in the transparent state, an ambient light beam sequentially penetrates the transparent polarizer film, the transparent light-guiding plate and the liquid crystal glass to provide a backlight source required by the transmissive display panel for displaying an image, and when the liquid crystal glass is in the atomization state, an illumination beam emitted by the at least one light bar of the backlight module enters the transparent light-guiding plate and is guided to the liquid crystal glass, such that the illumination beam penetrates the liquid crystal glass to serve as the backlight source required by the transmissive display panel for displaying the image;
a control unit, electrically connected with the transmissive display panel, the liquid crystal glass and the backlight module respectively; and
a photosensitive device, electrically connected to the control unit and configured to sense an intensity of the ambient light beam.

14. A displaying method of a display apparatus, comprising:
providing a display apparatus, wherein the display apparatus comprises:
a transmissive display panel;
a liquid crystal glass, disposed at a side of the transmissive display panel, having a transparent state and an atomization state and adapted to switch between the transparent state and the atomization state;
a backlight module, disposed at a side of the liquid crystal glass away from the transmissive display panel, the backlight module comprising a transparent light-guiding plate and at least one light bar, and the liquid crystal glass being located between the transmissive display panel and the transparent light-guiding plate; and
a transparent polarizer film, disposed at a side of the transparent light-guiding plate away from the liquid crystal glass, wherein the transparent polarizer film has a brightness enhancement function;
sensing an intensity of an ambient light beam by the display apparatus;
according to the intensity of the ambient light beam, turning on the liquid crystal glass and turning off the at least one light bar of the backlight module, such that the liquid crystal glass is in the transparent state, and the ambient light beam sequentially penetrates the transparent polarizer film, the transparent light-guiding plate and the liquid crystal glass to provide a backlight source required by the transmissive display panel for displaying an image; or according to the intensity of the ambient light beam, turning off the liquid crystal glass and turning on the at least one light bar of the backlight module, such that the liquid crystal glass is in the atomization state, an illumination beam emitted by the at least one light bar of the backlight module enters the transparent light-guiding plate and is guided to the liquid crystal glass, and the illumination beam penetrates the liquid crystal glass to serves as the backlight source required by the transmissive display panel for displaying the image.

15. The displaying method of the display apparatus according to claim 14, wherein after the step of sensing the intensity of the ambient light beam by the display apparatus, the method further comprises:
when the intensity of the ambient light beam is greater than a predetermined value, turning on the liquid crystal glass, such that the liquid crystal glass is in the transparent state; or
when the intensity of the ambient light beam is less than the predetermined value, closing the liquid crystal glass, such that the liquid crystal glass is in the atomization state.

16. The displaying method of the display apparatus according to claim 14, wherein the display apparatus further comprises:
a control unit, electrically connected with the transmissive display panel, the liquid crystal glass and the backlight module respectively.

17. The displaying method of the display apparatus according to claim 16, further comprising:
providing a manual switch component electrically connected to the control unit, turning on the liquid crystal glass and turning off the at least one light bar by the manual switch component, or turning off the liquid crystal glass and turning on the at least one light bar by the manual switch component.

18. A displaying method of a display apparatus, comprising:
providing a display apparatus, wherein the display apparatus comprises:
a transmissive display panel;
a liquid crystal glass, disposed at a side of the transmissive display panel, having a transparent state and an atomization state and adapted to switch between the transparent state and the atomization state;
a backlight module, disposed at a side of the liquid crystal glass away from the transmissive display panel, the backlight module comprising a transparent light-guiding plate and at least one light bar, and the liquid crystal glass being located between the transmissive display panel and the transparent light-guiding plate;
a transparent polarizer film, disposed at a side of the transparent light-guiding plate away from the liquid crystal glass; and
a control unit, electrically connected with the transmissive display panel, the liquid crystal glass and the backlight module respectively;
sensing an intensity of an ambient light beam by the display apparatus;
according to the intensity of the ambient light beam, turning on the liquid crystal glass and turning off the at least one light bar of the backlight module, such that the liquid crystal glass is in the transparent state, and the ambient light beam sequentially penetrates the transparent polarizer film, the transparent light-guiding plate and the liquid crystal glass to provide a backlight source required by the transmissive display panel for displaying an image; or
according to the intensity of the ambient light beam, turning off the liquid crystal glass and turning on the at least one light bar of the backlight module, such that the liquid crystal glass is in the atomization state, an illumination beam emitted by the at least one light bar of the backlight module enters the transparent light-guiding plate and is guided to the liquid crystal glass, and the illumination beam penetrates the liquid crystal glass to serves as the backlight source required by the transmissive display panel for displaying the image;
wherein the display apparatus further comprises a photosensitive device electrically connected to the control unit and configured to sense the intensity of the ambient light beam, wherein when the liquid crystal glass is in the atomization state, the photosensitive device senses the intensity of the ambient light beam and transmits a brightness information to the control unit according to the intensity of the ambient light beam, and the control unit transmits a brightness adjustment signal to the backlight module according to the brightness information to adjust brightness of the illumination beam of the backlight module.

* * * * *